United States Patent [19]

Matula

[11] 3,828,188

[45] Aug. 6, 1974

[54] ROTATIONAL POSITION SENSOR

[75] Inventor: Jerry Matula, Culver City, Calif.

[73] Assignee: Bell & Howell Company, Chicago, Ill.

[22] Filed: Feb. 12, 1973

[21] Appl. No.: 331,371

[52] U.S. Cl. .......................... 250/231 SE, 340/271

[51] Int. Cl. .......................... G01d 5/34, G08b 21/00

[58] Field of Search...... 250/231 SE, 219 S, 217 SS; 340/271; 242/189

[56] References Cited

UNITED STATES PATENTS

| | | | |
|---|---|---|---|
| 2,921,757 | 1/1960 | Houle | 250/209 X |
| 3,171,963 | 3/1965 | Bourguignon | 250/209 |
| 3,205,364 | 9/1965 | Pong | 250/231 SE |
| 3,242,482 | 3/1966 | Simon | 250/231 SE |
| 3,293,513 | 12/1966 | Biard et al. | 250/217 SS |
| 3,363,106 | 1/1968 | Park | 250/209 |
| 3,469,102 | 9/1969 | Huvers | 250/209 |
| 3,727,123 | 4/1973 | Smith | 340/271 X |

*Primary Examiner*—James W. Lawrence
*Assistant Examiner*—T. N. Grigsby
*Attorney, Agent, or Firm*—Fraser and Bogucki

[57] ABSTRACT

A rotational position sensor is disclosed in which the beam from a light emitting diode mounted on a rotatable element is directed onto a pair of adjacent photocells. The portion of the beam falling upon each of the photocells determines the photocell output signal. The output signals are combined to form a signal which varies generally linearly with the rotational position of the element upon which the light emitting diode is mounted. The photocells are disposed in relatively close relation to one another, and the light emitting diode is disposed relatively close to each of the photocells and a short distance from the axis of rotation of the element. By use of appropriate masks the size of the beam from the light emitting diode can be varied so as to provide linear response over varying angular ranges of movement of the rotatable element.

16 Claims, 13 Drawing Figures

ROTATIONAL POSITION SENSOR

BACKGROUND OF THE INVENTION

1. Field of the Invention

The present invention relates to rotational position sensors, and more particularly to sensors of the type in which varying portions of a light beam emitted by a light emitting diode or other source of illumination are directed onto one or more photoelectric cells to represent angular position of a rotatable element.

2. History of the Prior Art

Rotational position sensors have found use in a wide range of different applications. For example, in the case of magnetic tape decks it is not uncommon to provide a pair of arms for sensing tape tension adjacent supply and takeup reels on opposite sides of a tape driving mechanism such as a capstan. The supply and takeup reels are commonly driven by motors coupled to servo systems which are responsive among other things to the angular positions of the tension arms. In such situations it is desirable to be able to equip each of the tension arms with a rotational position sensor capable of producing an output which varies linearly with the angular position of the tension arm and which is at the same time of low cost and relatively maintenance free construction, has a minimum of moving parts, and has low inertia so as not to substantially interfere with the operation of the tension arms.

Rotational position sensors find similar application when used with the tension arms in certain cameras such as those of the microfilm type used in data processing operations. In such instances it is desirable to drive the reel motors for the film in accordance with the behavior of the tension arms to prevent stretching of the film. Stretching exposes and ruins the film. By the same token it is necessary that the film be sealed from exposure to any light sources used in conjunction with rotational position sensors for the tension arms, or alternatively that light sources be used which do not affect the film such as those within the infrared range.

A number of prior art rotational position sensors having some of the desirable properties noted above have been proposed. One such type of sensor positions a light emitting diode or other source of infrared radiation adjacent the rotatable portion of the tension arm or other element so as to direct a beam therefrom onto a mirror mounted for rotation with the tension arm. As the tension arm rotates the mirror reflects greater or lesser portions of the beam onto one or more photocells disposed adjacent the tension arm. Sensors of this type provide an output signal which varies generally linearly with the angular position of the tension arm. For film applications the infrared light sources do not expose the film thereby obviating the need for expensive or cumbersome light shielding. However sensors of this type suffer from a number of disadvantages which may seriously limit their usefulness for many applications. For one thing such arrangements are needlessly complex because of the problem of properly aligning the various components including the mirror so as to achieve the desired beam reflection. As a result frequent maintenance may be required. The presence of the mirror adds considerable inertia which may be a highly undesirable factor with some tension arms. A still further problem is the space often consumed by sensors of this type. Since light intensity is known to vary with the square of distance it is often necessary to locate the light emitting diode or other source and the photocells a substantial distance from the mirror so as to provide little change in the total distance of the light path from the diode through the mirror to the photocells throughout the required angular range of operation.

Ideally the light emitting diode or other source of illumination should be mounted directly on the rotatable element such as the tension arm so as to project a beam directly onto one or more photocells. Such arrangement has the advantages of simplicity, compactness, low cost, low maintenance and low inertia. However arrangements of this type have been considered impractical or impossible, among other reasons because of the problem of varying light intensity and the consequent problem of producing a linear output response.

BRIEF SUMMARY OF THE INVENTION

In accordance with the invention a rotational sensor having a substantially linear output response includes a light emitting diode mounted on a tension arm or other rotatable element and a plurality of photocells disposed adjacent the diode. It has been found that with the light emitting diode or other source of illumination located close to the axis of rotation and on the side thereof adjacent the photocells with the photocells located relatively close to the light source as well as to one another, the combined output of the photocells when properly amplified and processed varies substantially linearly with the angular position of the rotatable element. With the various distances properly maintained the distance between the light source and the plane of the photocells undergoes very little change over a relatively wide range of possible angular positions of the rotatable element. When such conditions are maintained the output of each photocell varies generally linearly with the portion of the beam from the light source directed thereon, and this despite the fact that the illumination intensity drops off quickly with increasing angular distance from the central axis of the light emitting diode.

In one preferred embodiment of a rotational sensor according to the invention a pair of generally planar photocells are disposed relatively close to one another and within a common plane adjacent the rotatably mounted light emitting diode. The distance between the light emitting diode and the photocells is relatively small, yet is larger than the distance which separates the photocells from one another. Such arrangement has been found to produce an output which varies generally linearly with angular position throughout an angular range the opposite extremes of which are defined by the angular positions at which the light beam is at the edge of one of the photocells.

In accordance with the invention the useful range of the rotational sensor can be extended as desired by increasing the angular width of the light beam such as through proper masking. For example use of masking techniques which provide for a light beam having an angular width on the order of 90° have produced a linear response throughout a useful range of 50° or greater.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
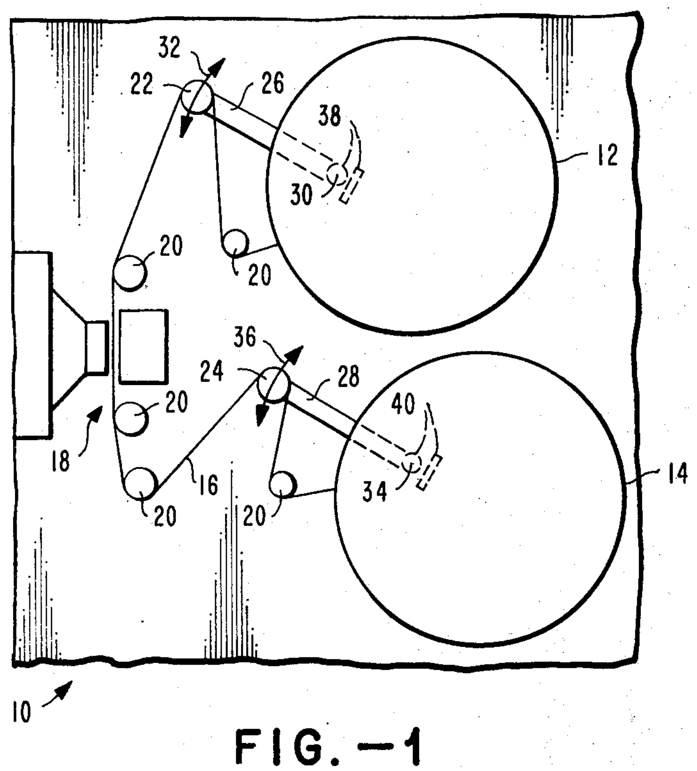
FIG. 1 is a plan view of a portion of a camera of the type in which rotational position sensors in accordance with the invention can be used to advantage.

FIG. 1 illustrates a portion of a camera of the type in which rotational position sensors in accordance with the invention may be used to advantage. The camera 10 of FIG. 1 is of the type used for microfilming in data processing operations and includes a pair of reels 12 and 14 for handling a length of photographic film 16 which extends therebetween and through an area including a film gate and lens 18. The film 16 is wound about a plurality of guide rollers 20 which help to define a path for the film 16 between the reels 12 and 14.

To prevent stretching or other distortion of the film 16 which may result in exposure of the film, and to improve the performance of the camera 10 in general, the film 16 is wound around a pair of guide rollers 22 and 24 respectively rotatably mounted at the ends of a pair of tension arms 26 and 28. The arm 26 is mounted for rotation about an axis 30 so as to move the guide roller 22 through an arc illustrated by an arrow 32. In similar fashion the arm 28 is mounted for rotation about an axis 34 so as to permit the guide roller 24 to move through an arc denoted by an arrow 36.

The reels 12 and 14 are individually driven by reel motors (not shown) which are controlled by a servo system responsive to the behavior of the film 16. Among other things such servo systems are responsive to film tension which is reflected by the rotational positions of the tension arms 26 and 28. Ideally the arms 26 and 28 are individually provided with rotational sensors of the type producing outputs which vary linearly with the angular or rotational positions of the arms 26 and 28. In the example of FIG. 1 the arms 26 and 28 are respectively provided with rotational position sensors 38 and 40 shown in dotted outline and described hereafter in connection with FIG. 3.

Figure 2:
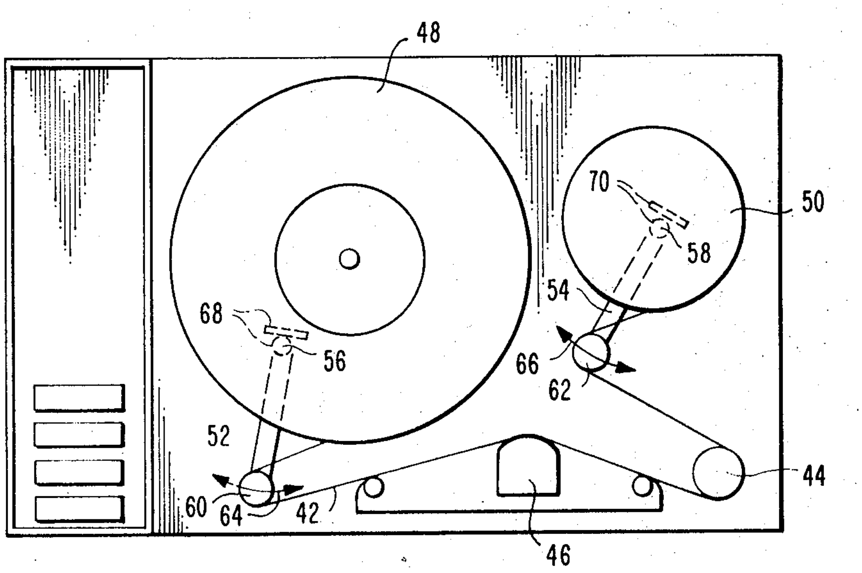
FIG. 2 is a plan view of a magnetic tape deck of the type in which rotational position sensors in accordance with the invention can be used to advantage.

FIG. 2 illustrates a further example in which rotational position sensors in accordance with the invention are highly useful. The arrangement of FIG. 2 is similar to that of FIG. 1 except that it involves magnetic tape rather than film. In the FIG. 2 arrangement a length of magnetic tape 42 is driven by a capstan 44 past a processing region 46 which may include magnetic read and write heads between opposite reels 48 and 50. As in the case of the FIG. 1 arrangement the reels 48 and 50 are individually driven by reel drive motors (not shown) through a servo system responsive to the behavior of the magnetic tape 42. Tape tension is determined by a pair of arms 52 and 54 respectively rotatably mounted about axes 56 and 58 and having guide rollers 60 and 62 respectively rotatably mounted at the opposite ends thereof from the axes 56 and 58 for engagement with the magnetic tape 42. The tension arm 52 is rotatable about the axis 56 so as to move the guide roller 60 through an arc indicated by an arrow 64. Similarly the arm 54 is rotatable about the axis 58 so as to allow movement of the roller 62 through an arc denoted by an arrow 66. Signals which vary linearly with the rotational positions of the arms 52 and 54 are respectively provided by sensors 68 and 70. The sensors 68 and 70 which correspond to the sensors 38 and 40 of FIG. 1 are described hereafter in connection with FIG. 3 to which attention is now directed.

Figure 3:
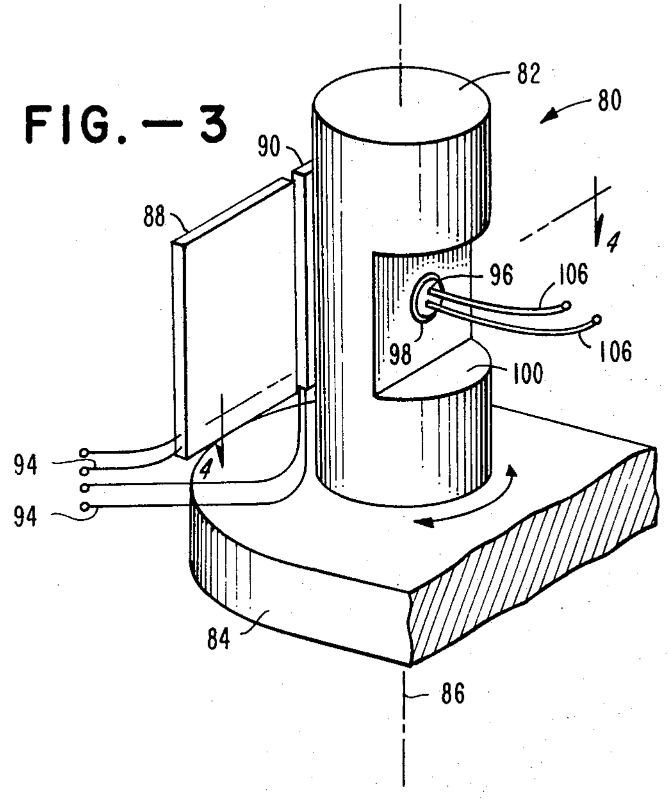
FIG. 3 is a perspective view of a rotational position sensor in accordance with the invention.
Figures 4, 12:
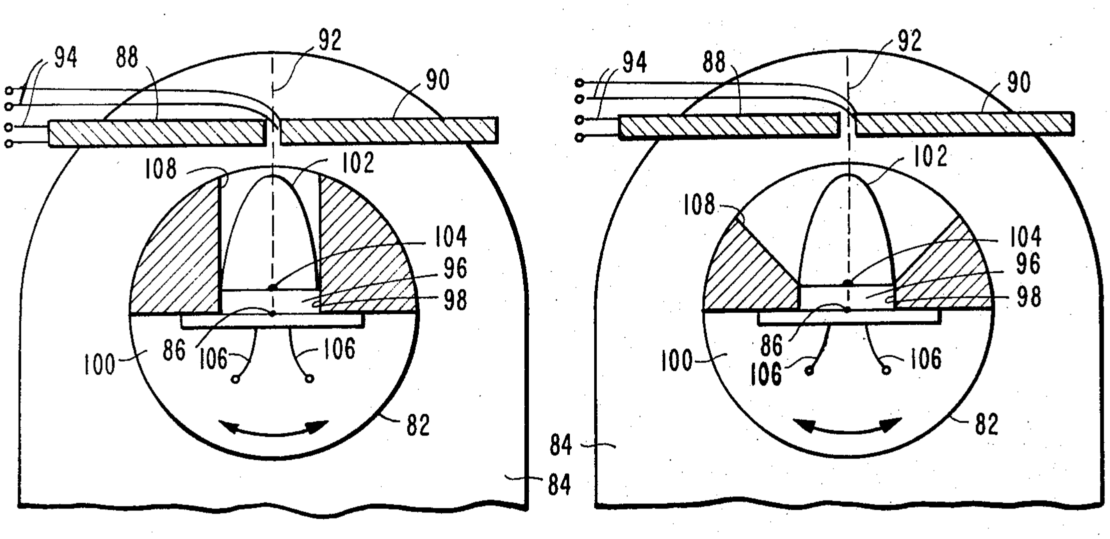
FIG. 4 is a section view of the sensor of FIG. 3 taken along the line 4—4 thereof.
FIG. 12 is a section view of the sensor of FIG. 3 corresponding to the section view of FIG. 4 and illustrating an alternative arrangement for providing a wider light beam.

FIG. 3 depicts a sensor 80 in accordance with the invention as including a generally cylindrical member 82 fixedly mounted to a rotatable element 84 whose rotational position is to be determined. The cylindrical member 82 is mounted so that the longitudinal axis thereof coincides with an axis of rotation 86 of the rotatable element 84. The sensor 80 includes a pair of generally planar photocells 88 and 90 disposed within a common plane adjacent the cylindrical member 82. As best seen in FIG. 4 the respective photocells 88 and 90 reside on opposite sides of and are generally perpendicular to a common radius represented by the dashed line 92 and forming a nominal radial axis for the sensor 80. The nominal radial axis 92 is perpendicular to the axis of rotation 86 as well as to the common plane of the photoelectric cells 88 and 90 and lies within a plane which extends through the axis of rotation 86 and which is perpendicular to the common plane of the cells 88 and 90. The photocells 88 and 90 include a plurality of leads 94 which carry the signals produced by the photocells 88 and 90 whenever light falls thereupon.

The cylindrical member 82 serves as a mounting member as well as a mask for a light source in the form of a light emitting diode 96. The diode 96 is mounted within a circular aperture 98 extending into the member 82 from a notched-out portion 100. As seen in FIG. 4 the diode 96 is mounted such that its central axis which is perpendicular to the axis of rotation 86 may coincide with the common radius 92 and may move through a plane which is generally perpendicular to the common plane of the photocells 88 and 90 with rotation of the member 82. While the diode 96 comprises a bulb 102 of relatively large size compared with the cross-section of the member 82 as seen in FIG. 4, the light generated thereby emanates from an area of the diode 96 which is sufficiently small so as to be considered a point source 104. The diode 96 is preferably mounted so that the point source 104 is located close to the axis of rotation 86 and on the side of the axis 86 adjacent the photocells 88 and 90. A pair of leads 106 extend from the base of the diode 96 and are coupled to an appropriate power source.

The cylindrical member 82 not only mounts the diode 96 but also serves as a mask therefor so as to constrain light from the diode 96 into a beam of predetermined shape or pattern and of sufficient width to render the sensor useful within a desired angular range of operation. In the example of FIG. 4 the forward portion of the diode 96 resides within a generally cylindrical aperture 108 which is defined by the member 82 and which in this instance comprises an extension of the aperture 98 in which the base of the diode 96 is mounted. As will be seen from the discussion to follow the width of the resulting beam which emanates from the point source 104 of the diode 96 is generally defined by the mask formed by the aperture 108. This beam defines an elongated path with rotation of the element 84. The photocells 88 and 90 are thus arranged side-by-side within the elongated path of the beam so as to be circumferentially spaced apart relative to the axis of rotation 86.

Figure 5:
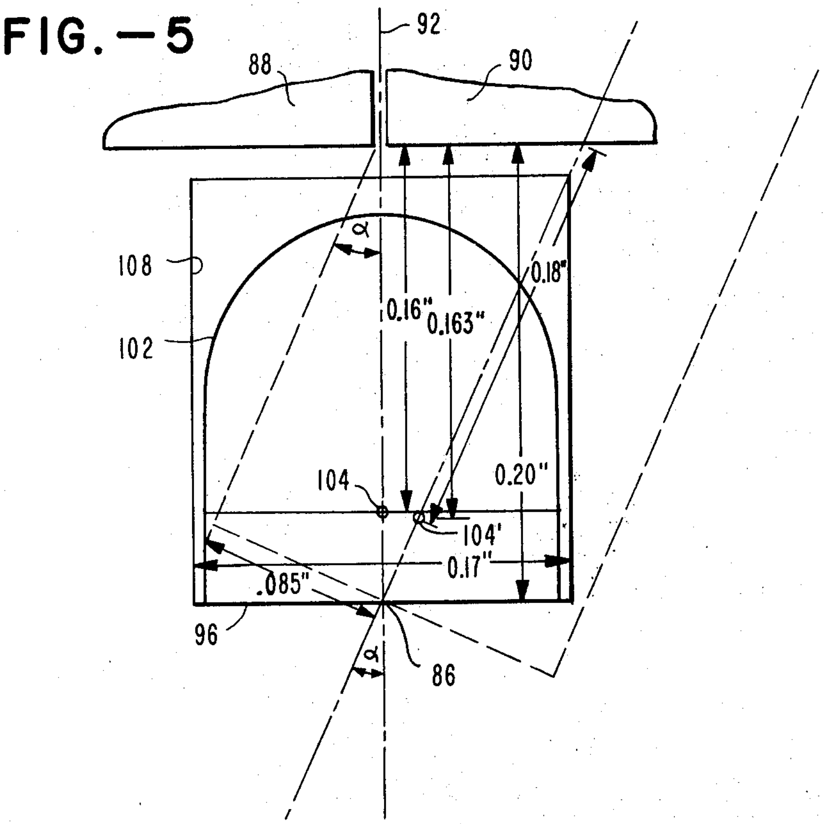
FIG. 5 is a diagrammatic representation of a portion of the sensor of FIG. 3 useful in explaining the operation thereof.

The light emitting diode 96 and its masking aperture 108 are shown greatly enlarged in FIG. 5 in conjunction with portions of the photocells 88 and 90. The particular dimensions shown in FIG. 5 pertain to one example of a sensor constructed and successfully tested in accordance with the invention. In that example the diode 96 comprises a light emitting diode sold as Model M4 by Litronix Corporation. The diode 96 is mounted within the aperture 108 of 0.17 inch diameter and has the point source of light 104 thereof located approximately 0.16 inch from the facing surfaces of the photocells 88 and 90. The axis of rotation 86 is located approximately 0.20 inch from facing surfaces of the photocells 88 and 90.

Since light intensity varies with the square of distance, the diode 96 is mounted relatively close to the photocells 88 and 90 in order to enjoy a high light intensity as seen in FIG. 5. For that matter the distance between the axis of rotation 86 and the photocells 88 and 90 is less than the combined width of the photocells 88 and 90 in the present example. A further reason for mounting the diode 96 close to the photocells 88 and 90 is the realization of a relatively large usable angle as discussed hereafter.

When the central axis of the diode 96 coincides with the common radius 92 an angle $\alpha$ which may be defined as the angle between the common radius 92 and the central axis of the diode 96 is 0°. If the diode 96 is now rotated about the axis 86 until the cylinder of the mask 108 is at the very edge of the photocell 88, the mask assumes an orientation as shown in dashed outline in FIG. 5. The angle $\alpha$ at this particular angular position may be calculated as follows:

$\sin \alpha = 0.085''/0.20'' = 0.425$

Therefore $\alpha = 25° 20'$

Since the diode 96 may also be rotated in the opposite direction to a point where the cylinder of the mask 108 is at the edge of the photocell 90, it can be determined that there is an angular range of approximately 50° within which the light from the diode 96 will strike both photocells 88 and 90 in varying amounts. As the diode 96 rotates through an angle of approximately 25° the distance between the point source 104 and the adjacent surfaces of the photocells 88 and 90 increases from 0.16 inch to 0.163 inch, at which point the point source 104 assumes a position denoted 104' in FIG. 5. At the same time the distance between the point source 104 and the adjacent surfaces of the photocells 88 and 90 along the central axis of the diode 96 increases from 0.16 inch to 0.18 inch.

Figure 6:
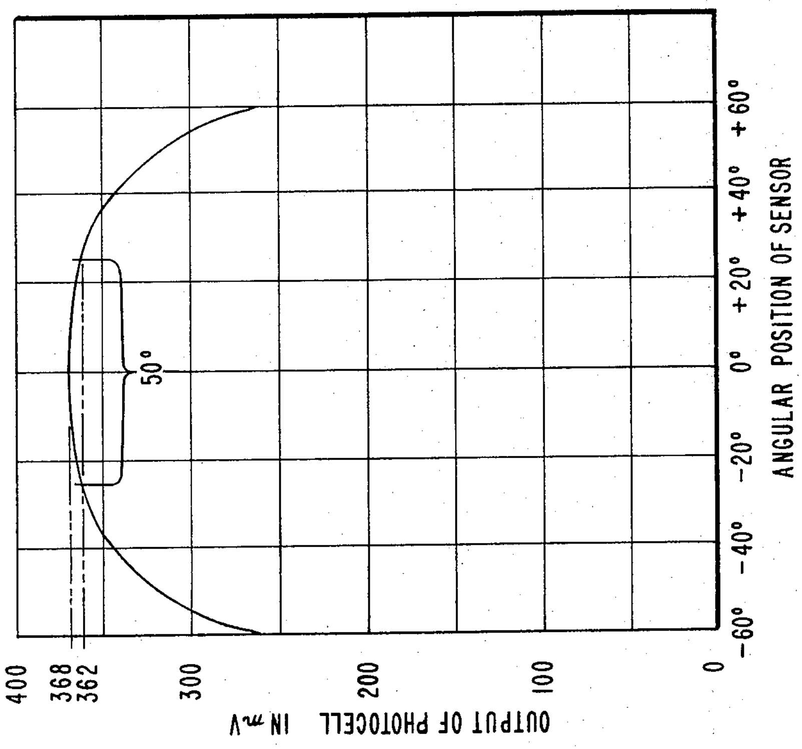
FIG. 6 is a diagrammatic plot of the output of a single photocell when placed in close proximity to the light emitting portion of the sensor of FIG. 3 as a function of angular position of the sensor.

The intensity of light from the diode 96 varies as a function of angle with respect to the central axis of the diode. Thus the light intensity at an angle of 45° relative to the central axis is commonly about one-fourth that along the central axis in diodes of this type. Yet in accordance with the invention it has been found that the combined output of photocells 88 and 90 varies substantially linearly with the angular orientation of the diode 96 so long as the perpendicular distance between the point source 104 and the adjacent faces of the photocells 88 and 90 undergoes only a relatively minor change. As noted in the present example this distance changes only 0.003 inch throughout a 50° range of rotation. To verify this a single photocell may be placed in front of the diode 96. In one such experiment the output of the single photocell as measured with a digital voltmeter was noted for various different angular positions of the diode 96. The results are depicted in FIG. 6. As will be seen from FIG. 6 the output of the single photocell is substantially linear over a 50° range and varies only between 362 millivolts and 368 millivolts or approximately 2 percent. This helps to further substantiate the fact that the photocell output varies primarily as a function of the portion of the light beam which falls upon the photocell and only varies slightly due to variations in the distance between the point source of the light and the surface of the photocell. Thus in the present example a substantially linear response can be achieved over a range of about 50° so long as the photocells are wide enough. In the example of FIG. 5 each of the photocells 88 and 90 must be at least two times 0.093 inch or 0.186 inch wide. It has been found that photocells approximately 5 millimeters in width meet this requirement. In one example of a sensor constructed and successfully tested in accordance with the invention the individual photocells used measured approximately 5 millimeters in width by approximately 20 millimeters in height.

Figure 7:
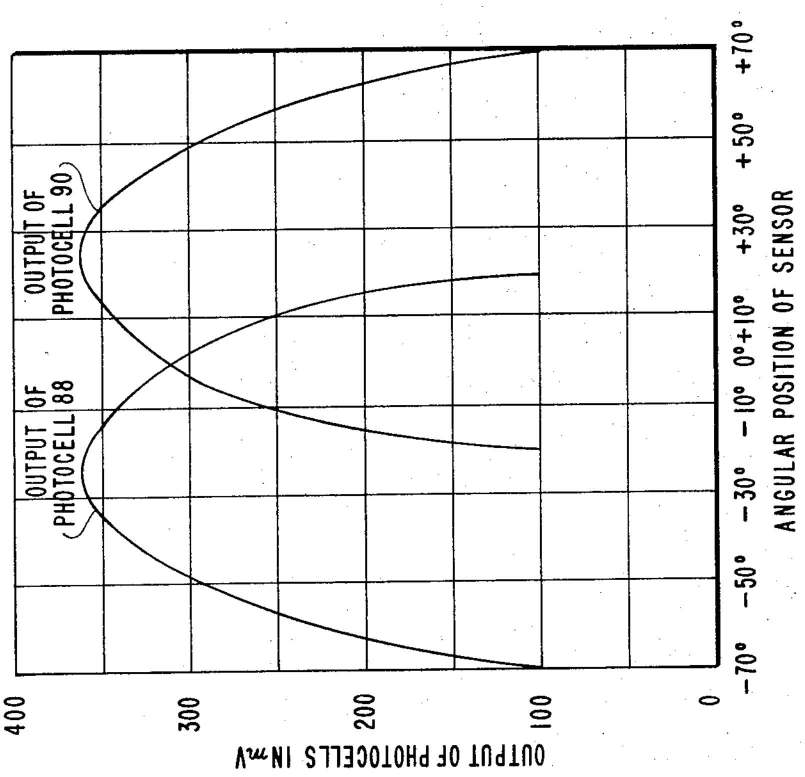
FIG. 7 comprises diagrammatic plots of the individual outputs of each of the photocells in the sensor of FIG. 3 as a function of angular position of the sensor.

If in the particular sensor of FIGS. 3 and 4 the outputs of the photocells 88 and 90 are individually measured under a no load condition as the sensor is rotated, a plot such as that shown in FIG. 7 results. It will be noted from FIG. 7 that in the range between approximately −20° and +20° the individual outputs of the photocells 88 and 90 slope relatively gradually so as to vary substantially linearly with respect to angular position. Outside of this range the curves change sharply due to a high increase in the internal resistance of one of the photocells. It is for this reason that a series connection of the photocells 88 and 90 is often not as desirable as a parallel connection.

Figure 9:
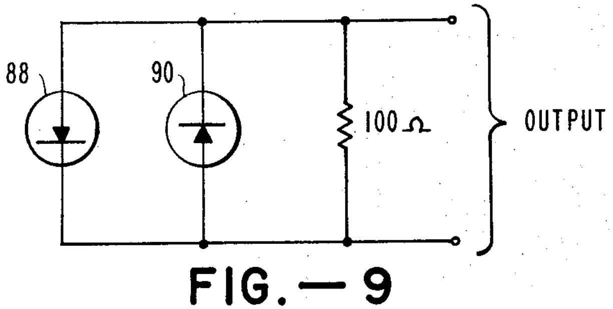
FIG. 9 is a schematic diagram of one circuit arrangement for coupling the photocells of the sensor of FIG. 3 together to produce a single output signal.
Figure 8:
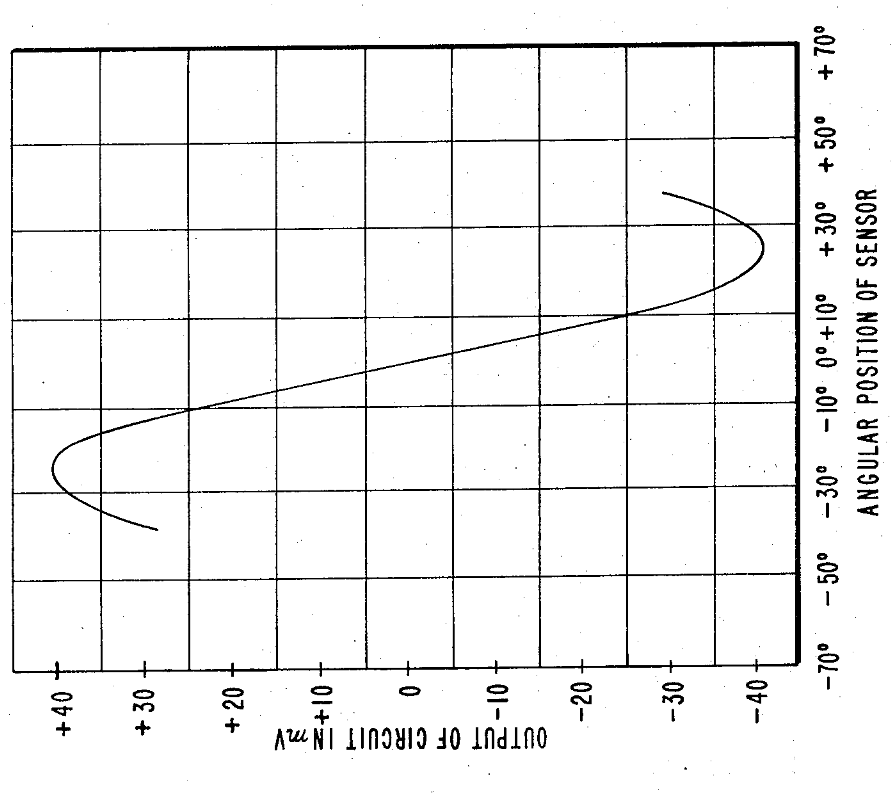
FIG. 8 is a diagrammatic plot of the outputs of the photocells of the sensor of FIG. 3 as a function of angular position of the sensor when the photocell outputs are combined in accordance with the circuit arrangement of FIG. 9.

One parallel connection in which the photocells 88 and 90 are used as a current source is illustrated in FIG. 9 with the resulting circuit output measured as a function of angular position of the sensor being plotted in FIG. 8. It will be noted from FIG. 8 that the combined output of the photocells 88 and 90 as produced by a parallel connection circuit such as that of FIG. 9 varies substantially linearly as a function of angular position of the sensor within a range of about 40° or from −20° to +20°. This is more than adequate for many applications of the sensor such as in the camera of FIG. 1 or the tape deck of FIG. 2 where the maximum range of movement of the tension arms is often on the order of 25°. It will also be appreciated from FIG. 8 that the combined output of the sensors 88 and 90 when coupled in parallel by a circuit such as that of FIG. 9 is more linear than the individual outputs of the photocells 88 and 90 depicted in FIG. 7, indicating that some of the nonlinearities present at the outputs of the individual photocells are canceled when such outputs are combined.

A parallel photocell connection of the type shown in FIG. 9 results in excellent thermal stability which is an inherent property of solar cell-type photocells when connected in short circuit. The internal resistance of the configuration undergoes very little variation over an angular range of about 40°. The internal resistance in one example of the invention varies between 97 ohms at the center ($\alpha = 0°$) and 91 ohms at the opposite extremes ($\alpha = \pm 17.5°$). This provides substantial temperature stability for very large temperature differences.

Figure 10:
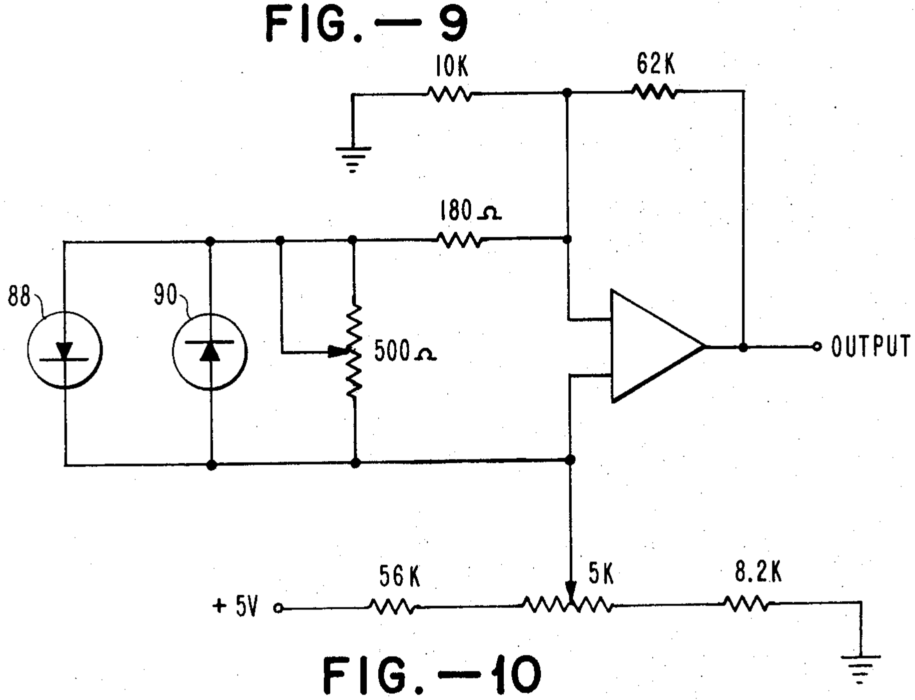
FIG. 10 is a schematic diagram of one preferred circuit for combining and amplifying the outputs of the photocells of the sensor of FIG. 3 while at the same time providing variable gain.

FIG. 10 illustrates one circuit which couples the photocells 88 and 90 in parallel and which may be advantageously used in the camera of FIG. 1 or the tape deck of FIG. 2. In the arrangement of FIG. 10 the maximum gain can be calculated by knowing the minimum photocell output which will be amplified to 5 volts, taking into account the tolerances of the photocell outputs as well as the mechanical tolerances. With a feedback resistance of 62 K ohms the desired input resistance can be calculated, and in this instance it is conveniently chosen to be 180 ohms. When the circuit arrangement of FIG. 10 is used with one of the tension arms in the arrangement of FIG. 1 or FIG. 2 the output voltage can be adjusted to vary between 0° and +10 volts as the associated tension arm moves between opposite extremes. With both photocells 88 and 90 completely short circuited, the output is adjusted to 5 volts using the 5 K potentiometer. By moving the tension arm the output voltage can be adjusted to +10 volts by adjusting the 500 ohm potentiometer. With the arm then placed in the 0 volt position the 5 K potentiometer is readjusted for 0 volt output, and the opposite arm position is then +10 volts.

Figure 11:
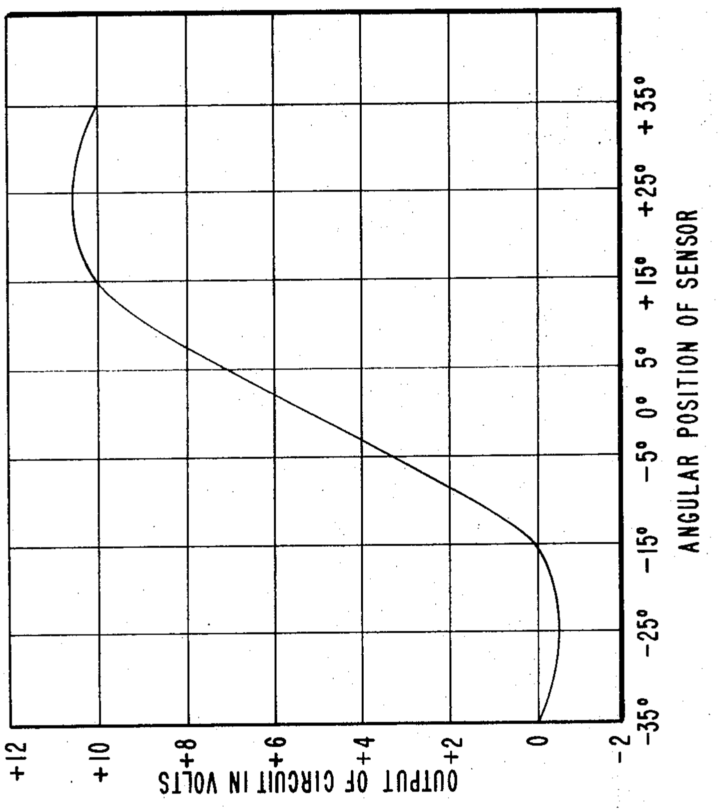
FIG. 11 is a diagrammatic plot of the outputs of the photocells of the sensor of FIG. 3 as a function of angular position of the sensor when the photocell outputs are combined in the circuit of FIG. 10.

FIG. 11 is a plot of the output voltage from the circuit of FIG. 10 as a function of angular position of the sensor of FIGS. 3 and 4. It will be observed that the response is extremely linear within the range ± 12½°. Since as previously noted the maximum tension arm movement in many systems of the type shown in FIGS. 1 and 2 is on the order of 25°, the system can be said to provide substantially complete linear response within this range.

Figure 13:
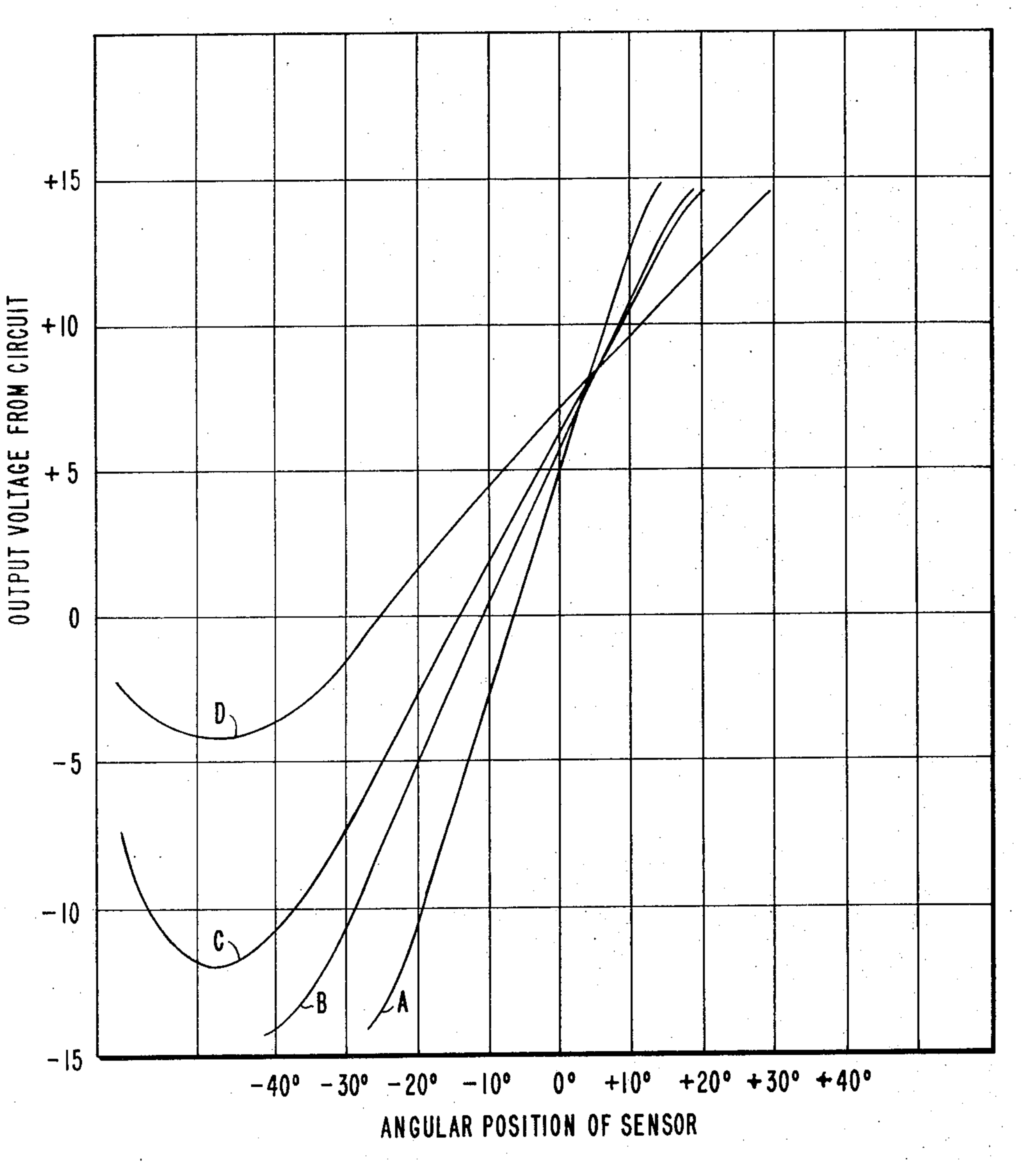
FIG. 13 comprises four different diagrammatic plots of the outputs of the phtotcells of the sensor of FIG. 3 utilizing the increased beam width of FIG. 12 as said photocell outputs are processed by the circuit of FIG. 10, each of the four different plots of FIG. 13 corresponding to a different gain setting in the circuit of FIG. 10.

For certain applications it may be desirable to increase the angular range over which the system can operate and still provide a substantially linear response. One way in which to accomplish this is to increase the width of the beam of light from the diode 96 as shown, for example, in FIG. 12. The FIG. 12 arrangement is the same as that of FIG. 4 except that the masking aperture 108 is partially conical rather than cylindrical in shape and is proportioned so as to provide a light beam of at least 90° width. Since as previously noted the effect of angular range of the sensor is for all practical purposes limited only by the physical extremes at which the light beam is at the very edge of one or the other of the photocells, it can be readily seen that an increase in the beam width increases the effective range of the sensor. This is shown by FIG. 13 which comprises plots of the output voltage from the circuit of FIG. 10 for varying angular positions of the sensor of FIG. 12, with each of the four different plots of FIG. 13 corresponding to a different gain setting of the circuit of FIG. 10. The plots or curves of FIG. 13 are respectively designated A, B, C and D in the order of decreasing gain as provided by adjustment of the 500 ohm potentiometer in the circuit of FIG. 10. At the highest gain "A", the output voltage increases and decreases rapidly at the expense of a limited angular range over which linearity is present. In the case of curve A the effective linear range is approximately ± 15° for a total effective range of 30°. At the other extreme represented by the curve D the rate of change of the output voltage for a given change in angular position is considerably reduced. At the same time however the effective angular range is greatly increased, and in the case of curve D is effective at least between approximately ± 30° for an effective range of about 60°. In any event it will be seen that widening of the light beam as is done in FIG. 12 provides a generally increased effective range over which the sensor response is linear.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A rotational position sensor comprising:

a light emitting diode;

means mounting the light emitting diode for movement about an axis of rotation and including a mounting member mounted for rotation about the axis of rotation and having the light emitting diode mounted therein so as to project light generally away from the axis of rotation, the mounting member having an aperture extending therein and surrounding the light emitting diode to form a mask therefor, said aperture defining the shape of a beam of light projected by the light emitting diode; and a pair of photoelectric cells disposed adjacent the light emitting diode and operative to generate varying output signals in accordance with the amount of light from the light emitting diode incident thereon as the light emitting diode undergoes movement about the axis of rotation.

2. The invention defined in claim 1, wherein the aperture is generally cylindrical in shape.

3. The invention defined in claim 1, wherein the aperture is generally partially conical in shape.

4. A rotational position sensor comprising:

an axis of rotation;

a source of light disposed substantially at the axis of rotation;

a pair of generally planar light sensitive elements disposed within a common plane which is generally parallel to the axis of rotation and spaced therefrom by a distance substantially greater than any distance between the source of light and the axis of rotation and the distance between the light sensitive elements, the light sensitive elements being operative to generate signals in accordance with the amount of light from the source of light incident thereon; and means mounting the source of light and the light sensitive elements for rotational motion relative to one another about the axis of rotation.

5. The invention defined in claim 4, wherein the source of light provides a light beam which moves through an elongated path with rotational motion of the source of light relative to the light sensitive elements, and the distance between the axis of rotation and the common plane of the light sensitive elements is less than the combined width of the light sensitive elements along the length of the elongated path.

6. The invention defined in claim 4, further including a generally cylindrical element disposed so that the central axis thereof is coincident with the axis of rotation and having an aperture therethrough which has a central axis intersecting and perpendicular to the axis of rotation, the source of light being mounted within the aperture, and wherein the light sensitive elements comprise photocells of generally planar configuration.

7. A rotational position sensor comprising:

an axis of rotation;

a generally point source of light disposed substantially at the axis of rotation;

a plurality of light sensitive elements disposed relative to the axis of rotation at generally fixed distances which are substantially greater than any distance between the source of light and the axis of rotation, the light sensitive elements being operative to generate signals corresponding to the amount of light from the source of light incident thereon; and means mounting the source of light and the light sensitive elements for rotational motion relative to one another about the axis of rotation.

8. The invention defined in claim 7, wherein the light sensitive elements are generally planar and are disposed in a common plane which is generally parallel to the axis of rotation.

9. The invention defined in claim 8, wherein there are two light sensitive elements which are spaced apart by a distance substantially smaller than the distance between the common plane of the light sensitive elements and the axis of rotation.

10. A rotational position sensor comprising:

a source of light;

means surrounding the source of light with at least one surface to form a mask therefor, the at least one surface defining the shape of a beam of light projected by the source of light;

a plurality of light sensitive elements;

means mounting the source of light and the light sensitive elements for rotational motion relative to one another; and the plurality of light sensitive elements being operative to generate varying output signals in accordance with the portion of the beam of light incident thereon as the source of light and the light sensitive elements undergo relative rotational motion.

11. The invention defined in claim 10, wherein the means forming a mask includes an element having an aperture therein, the source of light being mounted within the aperture.

12. The invention defined in claim 10, wherein the source of light is mounted to project the beam of light principally along an axis and the at least one surface of the means forming a mask varies in its distance from the axis to define the mask.

13. The invention defined in claim 12, wherein the at least one surface of the means forming a mask is of partially conical shape.

14. A sensor for providing an indication of the position of an element rotatable about an axis of rotation comprising:

means for generating a light beam of predetermined shape;

means for mounting the light beam generating means on the rotatable element so that the light beam moves through an elongated path with rotation of the rotatable element; and a pair of light sensitive elements disposed adjacent the rotatable element and spaced apart along the length of the elongated path of the light beam, each of the light sensitive elements being operative to generate a signal representing the portion of the light beam incident thereon, the distance between the axis of rotation and the light sensitive elements being less than the combined width of the light sensitive elements along the length of the elongated path.

15. The invention defined in claim 14, wherein the light sensitive elements lie within a common plane which is parallel to the axis of rotation and which is normal to a nominal radial axis extending through the axis of rotation, the light sensitive elements being spaced apart from one another by a relatively small distance and lying on oppoiste sides of the nominal radial axis.

16. The invention defined in claim 15, wherein the light from the light beam generating means emanates from a relatively small point which is spaced a relatively small distance from the axis of rotation.

* * * * *